United States Patent
Basu (10) Patent No.: US 8,077,641 B2
(45) Date of Patent: Dec. 13, 2011

(54) ECHO CANCELLATION FOR CHANNELS WITH UNKNOWN TIME-VARYING GAIN

(75) Inventor: Sumit Basu, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1264 days.

(21) Appl. No.: 11/423,437

(22) Filed: Jun. 10, 2006

(65) Prior Publication Data

US 2007/0286230 A1    Dec. 13, 2007

(51) Int. Cl.
*H04B 3/20* (2006.01)

(52) U.S. Cl. ...................................... 370/286

(58) Field of Classification Search .................. 370/224, 370/235, 249, 252, 286, 287, 289, 290, 291, 370/292, 294; 379/406.01; 382/100
See application file for complete search history.

(56) References Cited

U.S. PATENT DOCUMENTS

| | | | |
|---|---|---|---|
| 5,272,695 A | 12/1993 | Makino | |
| 5,428,562 A | 6/1995 | Gay | |
| 6,108,412 A | 8/2000 | Liu | |
| 6,137,881 A | 10/2000 | Oh | |
| 6,185,300 B1 | 2/2001 | Romesburg | |
| 6,233,347 B1 * | 5/2001 | Chen et al. | 382/100 |
| 6,925,176 B2 | 8/2005 | Myllyla | |
| 6,947,550 B2 | 9/2005 | Xiong | |
| 6,961,422 B2 | 11/2005 | Boland | |
| 2002/0076037 A1 * | 6/2002 | Nishimura | 379/406.01 |
| 2004/0018860 A1 | 1/2004 | Hoshuyama | |

OTHER PUBLICATIONS

Stokes, J., Malvar, H., "Acoustic Echo Cancellation with Arbitrary Playback Sampling Rate", Proceedings IEEE Conference on Acoustics, Speech, and Signal Processing, Montreal, pp. IV-153-IV-156, May 17-21, 2004.
Nagumo, J. I., Noda, A. "A learning method for system identification," IEEE Trans. Automat. Contr., vol. AC-12, pp. 282-287, 1967.
Sabin, M., and Gray, R. "Product Code Vector Quantizers for Waveform and Voice Coding." IEEE Trans on Acoustics, Speech, and Sig. Proc. 32(3): pp. 474-488. Jun. 1984.
Storn R., "Echo Cancellation Techniques for Multimedia Applications—A Survey," Int'l Comp. Sci Inst. TR-96-046, Berkeley, CA, Nov. 1996.

* cited by examiner

*Primary Examiner* — Kevin C Harper
*Assistant Examiner* — Leon Andrews
(74) *Attorney, Agent, or Firm* — Lyon & Harr, LLP; Mark A. Watson (57) ABSTRACT

After an initial training session, a "Dynamic Echo Canceller" (DEC) provides echo cancellation where only access to an input signal and a composite output signal are available, and the input signal is subjected to an unknown variable gain function. In one embodiment, the DEC uses echo cancellation to provide a "clean" copy of a second input signal where only a first input signal and a composite of the first and second input signal is available. An example is a "black box" amplifier coupled to a microphone and a phone line, with access to only the microphone input and a combined output signal where it is desired to retrieve a clean copy of a remote caller signal from the combined output. The DEC is applicable to many fields, including: signal separation; cancellation of echoes caused by impedance mismatches, periodic electrical noise, acoustic echoes caused by acoustic coupling, etc.

20 Claims, 5 Drawing Sheets

ECHO CANCELLATION FOR CHANNELS WITH UNKNOWN TIME-VARYING GAIN

BACKGROUND

1. Technical Field

The invention is related to echo cancellation, and in particular, to automatic echo cancellation for channels with unknown varying gain characteristics.

2. Related Art

Echo cancellation is an important element in a variety of applications, and is well known to those skilled in the art. In general, echo cancellation is the digital cancellation of electrical or acoustic echoes or signals such that the echoes are attenuated or eliminated. Typical uses for echo cancellation include systems for cancelling hybrid echoes, such as echoes caused by an impedance mismatch along an electrical line; cancelling periodic noise introduced by a power source, such as 60 Hz noise introduced via a conventional electrical socket; or cancelling acoustic echoes, such as echoes caused by acoustic coupling of sound from a loudspeaker to a microphone. Echo cancellation also allows one signal to be extracted from a composite of two signals. Regardless of the type of echo being cancelled, similar techniques are applied.

For example, acoustic echo cancellation (AEC) is generally used to cancel out the echoes of acoustic sound waves that are formed in an "echo loop" when sound emitted by one or more loudspeakers is picked up by one or more microphones. AEC generally operates by obtaining one or more playback signals, each going to corresponding loudspeakers, and subtracting an estimate of the echo produced by that playback signal from the one or more microphone signals. Specifically, the playback signals through this echo loop are transformed and delayed, background noise, and possibly near end speech, are added at the microphone, and a subtraction process for the echo cancellation is used. The signal obtained after subtraction is called the error signal, and the typical goal is to minimize the error signal when no near end speech is present in the microphone signal.

Typical AEC systems generally use adaptive filtering techniques to identify or "learn" a transfer function of the room that contains the loudspeakers and microphones. This transfer function generally depends on the physical characteristics of the room environment. The adaptive filter works by taking the playback signal sent to the speakers and recursively adjusting a set of coefficients that represent an impulse response of the room. The error signal, which is the estimated echo subtracted from the actual echo, is then used to change the filter coefficients such that the error is minimized.

Unfortunately, conventional AEC schemes generally assume that any gain function being applied to the input signal is constant. Consequently, in the case where a first input signal is known, but some unknown and varying gain function is applied to that first input signal, and an unknown second input signal is then combined with the first input signal to produce a known composite output signal, conventional AEC schemes are unable to provide adequate echo cancellation. In other words, where no direct access to the varying gain function applied to the first input signal is available, and no direct access to the second input signal is available, conventional AEC schemes are unable to provide a good estimate of the second input signal via echo cancellation to remove the first signal from the composite output signal. This problem is especially acute in the case where the gain function varies rapidly, such as in the case of a conventional automatic gain control (AGC) being applied to the first input signal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A "Dynamic Echo Canceller" (DEC), as described herein, provides a unique signal separation method for separating a second input signal from a first input signal where an unknown gain stage is applied to the first input signal in an environment where a pre-combination output of that gain stage cannot be accessed. In other words, the DEC is capable of providing an estimated "clean" copy of the second input signal where only the first input signal and the composite of the first and second input signal is available. An example of such an environment is a "black box" amplifier coupled to a microphone and a phone line, with access to only the microphone input and a combined output signal where it is desired to retrieve a clean copy of a remote caller signal from the combined output.

The signal separation or "echo cancellation" capability provided by the DEC is applicable to a number of fields, including, for example: signal separation; cancellation of echoes caused by impedance mismatches along electrical lines; cancellation of periodic noise introduced by conventional power sources; cancellation of acoustic echoes caused by acoustic coupling of sound from a loudspeaker to a microphone; cancellation of radar or sonar echoes; etc. Therefore, it should be understood that the DEC described herein is not intended to be limited to use in acoustic echo cancellation (AEC) systems. However, for purposes of explanation, the DEC will be described in the context of an AEC system with respect to separation of acoustic audio signals via echo cancellation.

In general, the DEC operates by first learning or estimating a "scale-free channel model" $\tilde{H}$ given a first input signal $x[n]$ and an output signal $y[n]$ where $\tilde{H}$ represents a channel characteristic defined by an unknown time-varying gain being applied to the first input signal $x[n]$ in combination with an unknown continuous scaling $s[n]$, and $y[n]$ represents a combination of the scaled $x[n]$ with a second input signal $r[n]$.

The scale-free channel model $\tilde{H}$ is basically a multi-tap filter (also referred to herein as a "transfer function") computed as a function of the input signal $x[n]$ and a normalized version of $y[n]$. Once computed, $\tilde{H}$ is then applied to a windowed version of the first input signal $x[n]$ to construct a transformed signal. The DEC then removes a best-fit projection of this transformed signal from the output signal $y[n]$ to recover an estimate copy of the second input signal $r[n]$. Note that it is assumed that second input signal $r[n]$ is not directly available to the DEC.

In particular, in an initial training session, samples of the first input signal $x[n]$ and the output signal $y[n]$ are provided to the DEC at a time when the second input signal $r[n]$ is null. In other words, this initial training session is performed at a time when no "double-talk" is occurring, i.e., when there is no contribution to the output signal $y[n]$ from the second input signal $r[n]$. As is well known to those skilled in the art, most DEC algorithms follow this approach of adapting model parameters only when there is no double-talk, and many methods for doing double-talk detection can be found in the literature.

Given these initial training signals, $x[n]$ and $y[n]$, the DEC first normalizes each sample of $y[n]$ with respect to a "relevant region" of samples from $x[n]$ to generate a normalized signal $\tilde{y}[n]$. In general, the relevant region of samples from x[n] for each sample of y[n] includes those samples from x[n] that will be used to predict each corresponding sample of y[n] given the scale-free channel model $\tilde{H}$. Given the normalized training signal $\tilde{y}[n]$, the coefficients of $\tilde{H}$ are then learned as a function of x[n] and $\tilde{y}[n]$.

In general, once the coefficients of $\tilde{H}$ have been learned from x[n] and $\tilde{y}[n]$, the resulting transform model $\tilde{H}$ is used to predict the contribution of x[n] to y[n] in a "scale-free" sense so that an estimate $\hat{r}[n]$ of the second input signal r[n] can be extracted from y[n].

In particular, once $\tilde{H}$ has been learned, "live signals" x[n] and y[n] are then evaluated to determine the unknown continuous scaling s[n] by performing a windowed projection of $\tilde{h}[n]*x[n]$ onto y[n], where s[n] represents the continuous scaling (over each window) that provides the "best fit" of $\tilde{h}[n]*x[n]$ onto y[n]. Finally, given $\tilde{H}$ and s[n], the estimate of the second input signal r[n] is simply extracted from y[n] as the residual of the best fit of $\tilde{h}[n]*x[n]$ onto y[n].

In view of the above summary, it is clear that the DEC described herein provides a unique system and method for providing echo cancellation where only access to an input signal and a composite output signal are available, and the input signal is subjected to an unknown and rapidly varying gain. In addition to the just described benefits, other advantages of the DEC will become apparent from the detailed description that follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
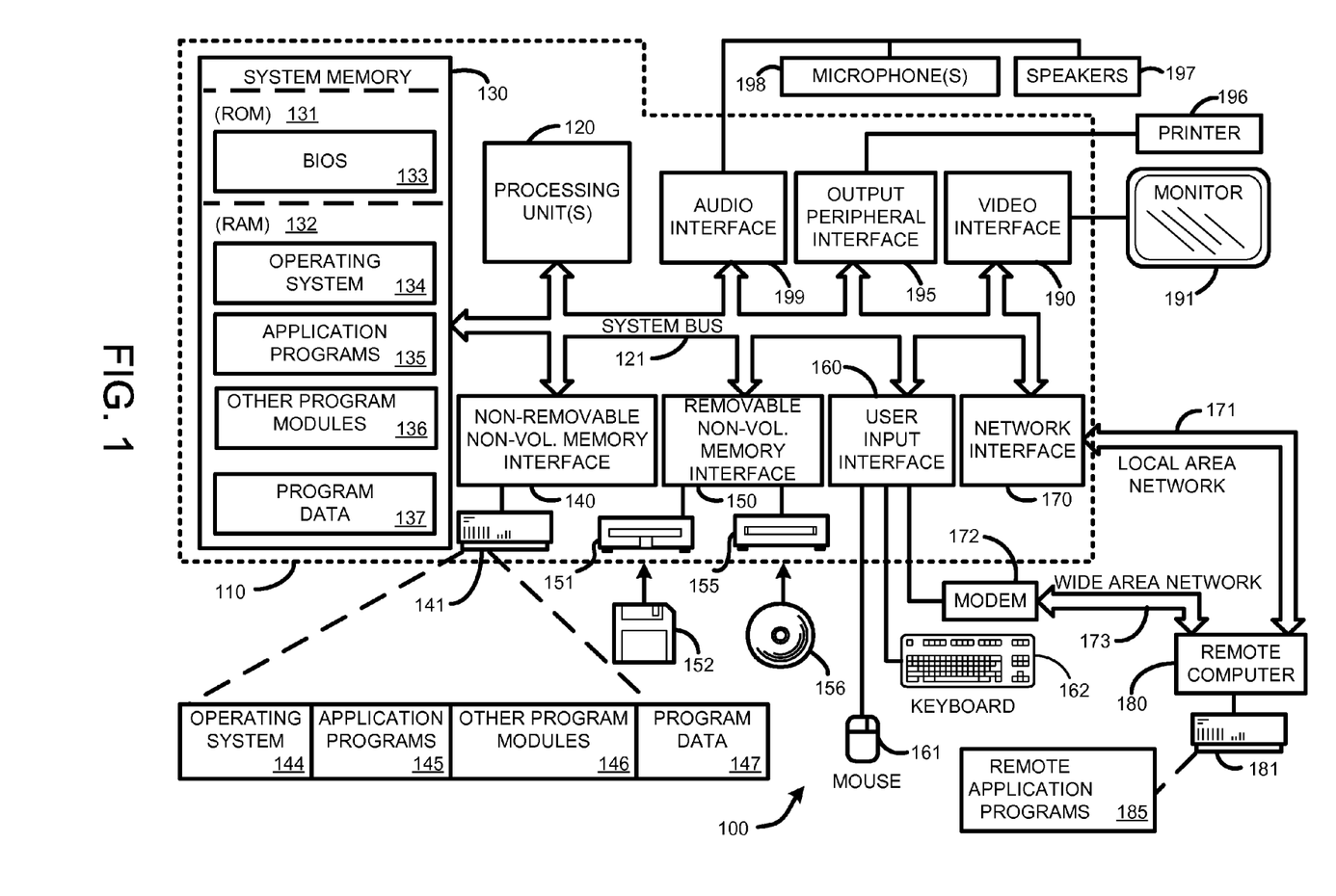
FIG. 1 is a general system diagram depicting a general-purpose computing device constituting an exemplary system for use in implementing a "Dynamic Echo Canceller" (DEC), as described herein.
Figure 2:
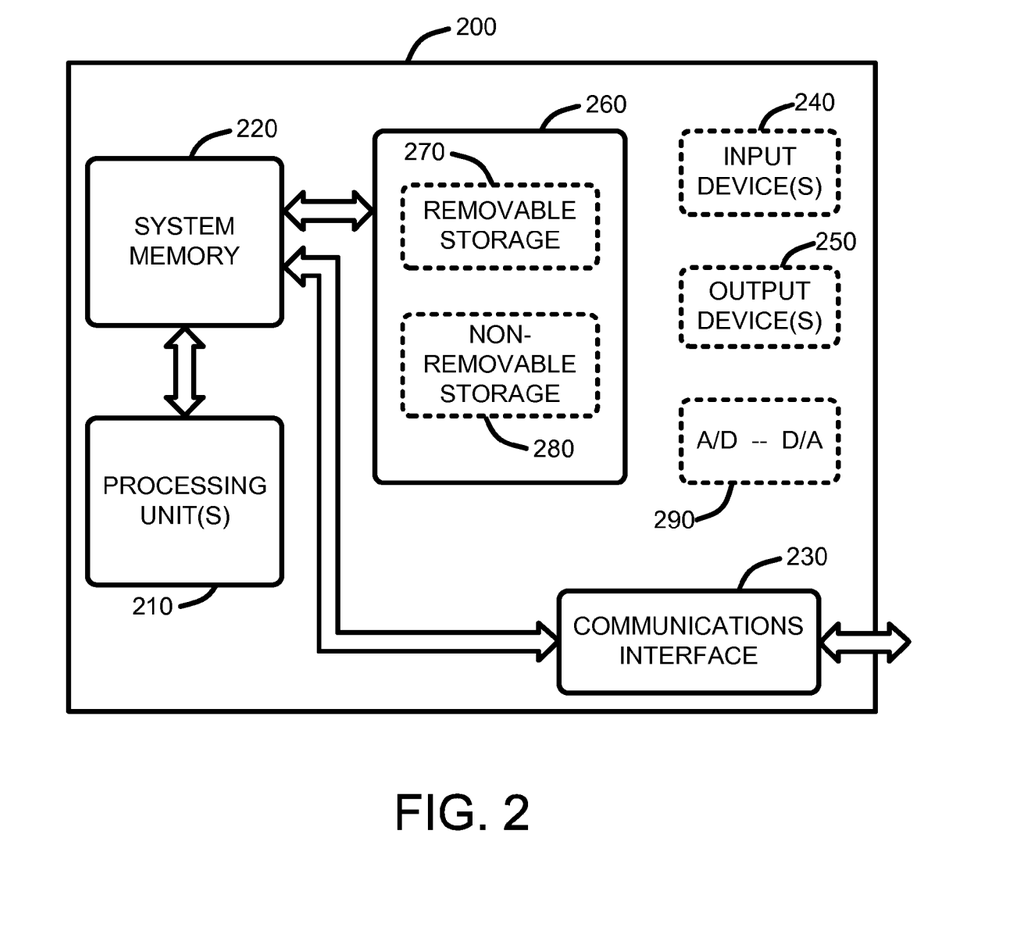
FIG. 2 is a general system diagram depicting a general device having simplified computing and I/O capabilities for use in implementing a "Dynamic Echo Canceller" (DEC), as described herein.

1.0 Exemplary Operating Environments:

FIG. 1 and FIG. 2 illustrate two examples of suitable computing environments on which various embodiments and elements of a "Dynamic Echo Canceller" (DEC), as described herein, may be implemented.

For example, FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with various hardware modules. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor, computers may also include other peripheral output devices such as a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

With respect to FIG. 2, this figure shows a general system diagram showing a simplified computing device. Such computing devices can be typically be found in devices having at least some minimum computational capability in combination with a communications interface for receiving input signals, including, for example, cell phones, PDA's, dedicated media players (audio and/or video), etc. It should be noted that any boxes that are represented by broken or dashed lines in FIG. 2 represent alternate embodiments of the simplified computing device, and that any or all of these alternate embodiments, as described below, may be used in combination with other alternate embodiments that are described throughout this document.

At a minimum, to allow a device to implement the functionality of the DEC, the device must have some minimum computational capability, some storage capability, and a communications interface for allowing signal input. In particular, as illustrated by FIG. 2, the computational capability is generally illustrated by processing unit(s) 210 (roughly analogous to processing units 120 described above with respect to FIG. 1). Note that in contrast to the processing unit(s) 120 of the general computing device of FIG. 1, the processing unit(s) 210 illustrated in FIG. 2 may be specialized (and inexpensive) microprocessors, such as a DSP, a VLIW, or other microcontroller rather than the general-purpose processor unit of a PC-type computer or the like, as described above.

In addition, the simplified computing device of FIG. 2 may also include other components, such as, for example one or more input devices 240 (analogous to the input devices described with respect to FIG. 1). The simplified computing device of FIG. 2 may also include other optional components, such as, for example one or more output devices 250 (analogous to the output devices described with respect to FIG. 1). The simplified computing device of FIG. 2 also includes storage 260 that is either removable 270 and/or non-removable 280 (analogous to the storage devices described above with respect to FIG. 1). Finally, the simplified computing device of FIG. 2 may also include an analog-to-digital and/or digital-to-analog converter 290 for converting signals input via the communications interface 230 to and from analog to digital as necessary.

The exemplary operating environment having now been discussed, the remaining part of this description will be devoted to a discussion of the program modules and processes embodying a "Dynamic Echo Canceller" (DEC) which provides echo cancellation where only access to an input signal and a composite output signal are available, and the input signal is subjected to an unknown and rapidly varying gain.

2.0 Introduction:

After an initial training session, a "Dynamic Echo Canceller" (DEC), as described herein, provides echo cancellation where only access to an input signal and a composite output signal are available, and the input signal has been subjected to an unknown variable gain function. For example, in one embodiment, the DEC uses echo cancellation to provide an estimated "clean" copy of a second unknown input signal where only a first input signal and a composite of the first signal and the second unknown input signal is available. An example of such an environment is a "black box" amplifier coupled to a microphone and a phone line, with access to only the microphone input x[n] and a combined output signal y[n] where it is desired to retrieve an estimated copy r̂[n] of an unknown remote caller signal r[n] from the combined output y[n].

Figure 3:
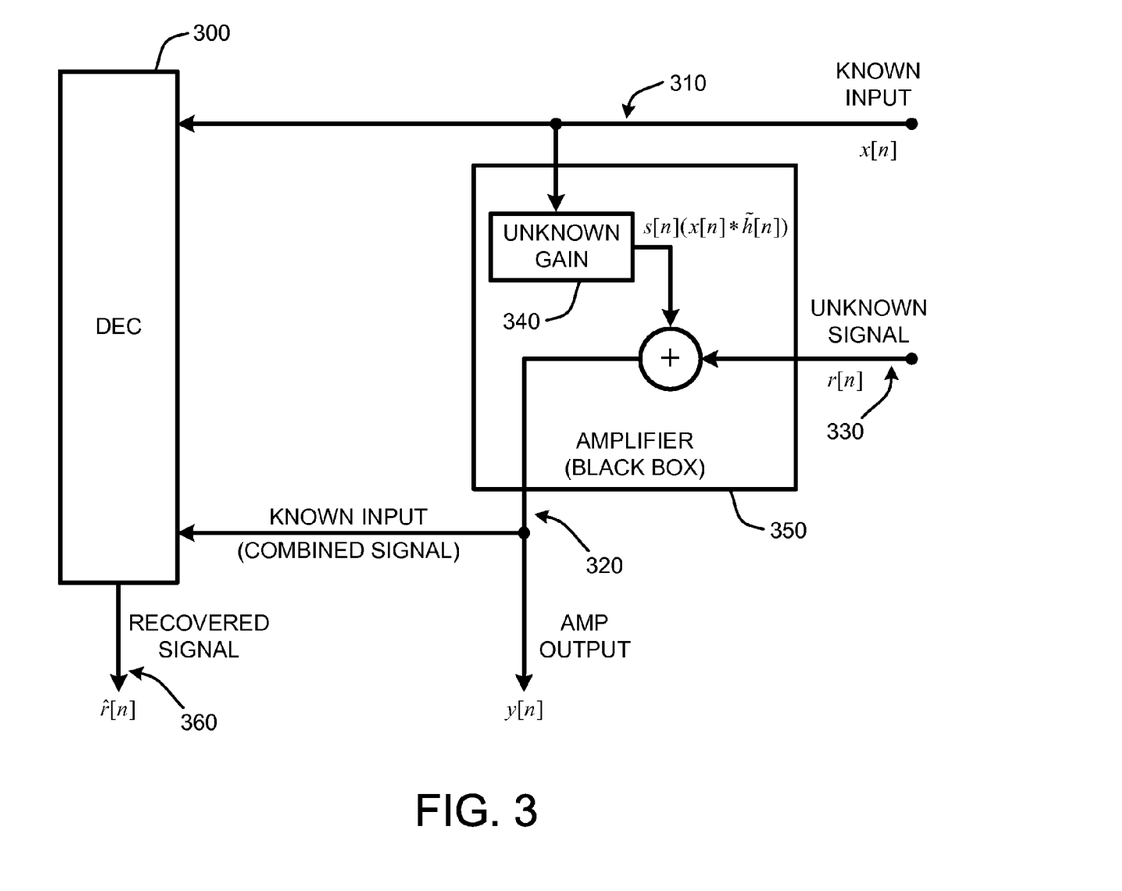
FIG. 3 provides an exemplary system diagram showing the DEC recovering an estimate of an unknown signal from a combination signal, wherein the combination signal comprises a combination of the known signal subjected to an unknown gain function and the unknown signal, as output from a "black box" amplifier, as described herein.

A simple example of this "black box" scenario is provided with respect to FIG. 3. In particular, as illustrated by FIG. 3, the DEC 300 receives two inputs, a known input signal x[n] 310 and a known combination signal y[n] 320, where y[n] is the signal resulting from a combination of x[n] with an unknown signal r[n] 330 following application of an unknown gain function 340 (across unknown channel H) to x[n] in a "black box" amplifier 350. The DEC 300 then takes the two inputs x[n] 310 and y[n] 320 and recovers an estimate r̂[n] 360 of the previously unknown signal r[n] 330.

It should be noted that the signal separation or "echo cancellation" capability provided by the DEC is applicable to a number of fields, including, for example: signal separation; cancellation of echoes caused by impedance mismatches along electrical lines; cancellation of periodic noise introduced by conventional power sources; cancellation of acoustic echoes caused by acoustic coupling of sound from a loudspeaker to a microphone; cancellation of radar or sonar echoes; etc. Therefore, it should be understood that the DEC described herein is not intended to be limited to use in acoustic echo cancellation (AEC) systems. However, for purposes of explanation, the DEC will generally be described herein in the context of an AEC system with respect to separation of acoustic audio signals via echo cancellation.

2.1 System Overview:

As noted above, the DEC described herein provides an echo cancellation capability where only access to an input signal x[n] and a composite output signal y[n] are available, and a channel H receiving the input signal is subjected to a channel characteristic defined by an unknown time-varying gain, H̃ in combination with an unknown continuous scaling s[n]. As noted above, the composite output signal y[n] is comprised of a scaled version of the input signal x[n] and an unknown signal r[n]. In other words:

$$y[n]=s[n](\tilde{h}[n]*x[n])+r[n] \qquad \text{Equation 1}$$

In general, the DEC is initially trained by first learning or estimating coefficients of a "scale-free channel model" H̃ which is basically a multi-tap filter (also referred to herein as a "transfer function") computed as a function of the first input signal x[n] and a normalized version of the combination output signal y[n]. Note that H̃ represents an unknown, but varying, gain, being applied to the first input signal x[n] in combination with an unknown continuous scaling s[n], and y[n] represents a combination of the scaled x[n] with an unknown second input signal r[n]. It should be noted in further embodiments, H̃ is periodically updated by reevaluating the signals x[n] and y[n] during periods in which there is negligible input to y[n] from r[n]. In other words, the initial training may be repeated as needed to update H̃ in the event that the signal channel H̃ varies slowly over time for some reason, as is often the case in DEC applications.

Once the coefficients of H̃ have been learned in the initial training session, H̃ is then used to predict the contribution of x[n] to y[n] in a "scale-free" sense so that the estimated copy r̂[n] of the second input signal r[n] can be extracted from y[n] when r[n] is no longer a null signal.

In particular, given H̃, both x[n] and y[n] are divided into a set of windows and a projection-based "best fit" of x[n]*h̃[n] is then removed from y[n] to recover the "clean" or estimated copy r̂[n] of the second input signal r[n], since, in view of Equation 1:

$$r[n]=y[n]-s[n](\tilde{h}[n]*x[n]) \qquad \text{Equation 2}$$

In various embodiments, the aforementioned projection is either a piecewise constant vector projection over the windows, or is a higher order "ramp projection" which is not piecewise constant over the windows. Note that the ramp projection allows for a linear (or non-linear) variation in gain within the window, depending upon the degree of polynomial used to model the variation in gain attributable to s[n]. Further, both the vector projection and the ramp projection may be used in combination in various embodiments to provide an increase in the fidelity of the recovered signal r̂[n].

As should be appreciated by those skilled in the art, the ability to extract an estimated copy of r[n] from y[n] enables a number of capabilities including signal extraction and various forms of echo cancellation.

Figure 4:
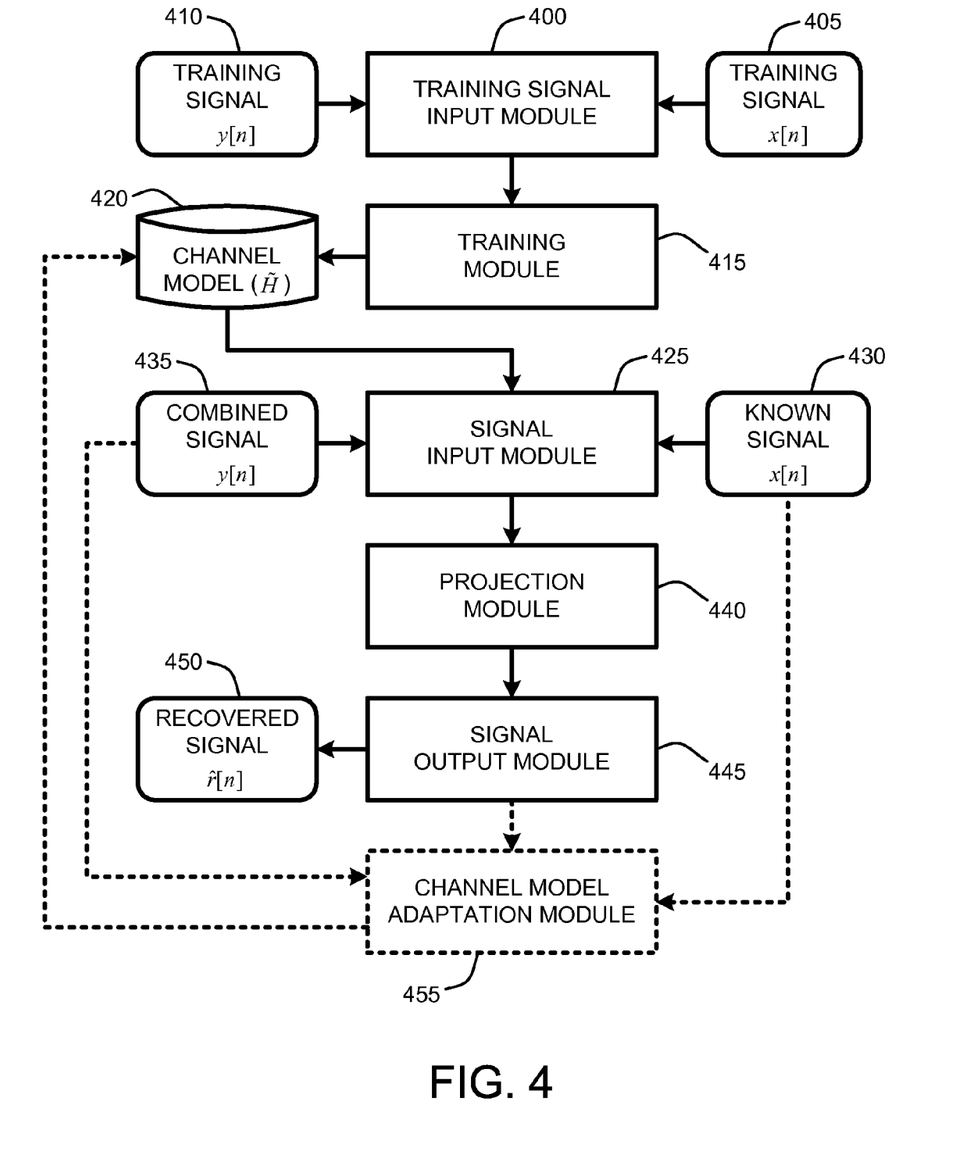
FIG. 4 provides an exemplary architectural flow diagram that illustrates program modules for implementing the DEC, as described herein.

2.2 System Architectural Overview:

The processes summarized above are illustrated by the general system diagram of FIG. 4. In particular, the system diagram of FIG. 4 illustrates the interrelationships between program modules for implementing the DEC, as described herein. It should be noted that any boxes and interconnections between boxes that are represented by broken or dashed lines in FIG. 4 represent alternate embodiments of the DEC described herein, and that any or all of these alternate embodiments, as described below, may be used in combination with other alternate embodiments that are described throughout this document.

In general, as illustrated by FIG. 4, the DEC begins operation by using a training signal input module 400 to receive a pair of training signals x[n] 405 and y[n] 410. Further, it is assumed that the training signal y[n] 410 has been produced by subjecting the training signal x[n] 405 to an unknown gain function (consisting of an unknown and continuously varying gain) and that there are no other inputs (or only negligible inputs) to the training signal y[n]. These training signals x[n] 405 and y[n] 410 are then passed to a training module 405 which evaluates x[n] 405 and y[n] 410 to learn coefficients for the scale free channel model $\tilde{H}$ 420.

In particular, the training module 420 receives samples of the input signals x[n] 405 and y[n] 410 at a time when there are no additional inputs to y[n] other than a scaled version of x[n]. In other words, it is assumed that the signal r[n] that will eventually be extracted from y[n], once the DEC has been trained, is not contributing to y[n] 410 at the time that y[n] is sampled for training. Given these initial training signals, x[n] 405 and y[n] 410, the training module 415 first normalizes each sample of y[n] with respect to a "relevant region" of samples from x[n] to generate a normalized signal $\tilde{y}[n]$.

As described in further detail in Section 3, the relevant region of samples from x[n] 405 for each sample of y[n] 410 includes those samples from x[n] that will be used to predict each corresponding sample of y[n] given the scale-free channel model $\tilde{H}$ 420. Given the normalized training signal $\tilde{y}[n]$, the coefficients of $\tilde{H}$ 420 are then learned as a function of x[n] 405 and $\tilde{y}[n]$ by solving for a set of coefficients (of $\tilde{H}$) that will best fit x[n] to $\tilde{y}[n]$. Note that because x[n] 405 is being fit to a normalized version of y[n] 410, $\tilde{H}$ 420 is considered to be a "scale-free" channel model.

Next, once the training module 415 has returned the channel model $\tilde{H}$ 420, the DEC is ready to process "live" signals x[n] 430 and y[n] 435, wherein y[n] is a combination of an unknown signal r[n] and the known signal x[n] 430 that has been scaled by the unknown gain function. In particular, a signal input module 425 receives both signals x[n] 430 and y[n] 435 and the channel model $\tilde{H}$ 420. The signal input module 425 then passes x[n] 430, y[n] 435, and the channel model $\tilde{H}$ 420 to a projection module 440 that predicts the contribution of x[n] to y[n] by first determining an unknown continuous scaling s[n] being applied to x[n] in combination with the variable gain function.

In particular, once $\tilde{H}$ has been learned, the projection module 440 determines the unknown continuous scaling s[n] by performing a windowed projection of $\tilde{h}[n]*x[n]$ 430 onto y[n] 435, where s[n] represents the continuous scaling (over each window) that provides the "best fit" of $\tilde{h}[n]*x[n]$ onto y[n]. A signal output module 445 then outputs the residual of this projection-based best fit as the recovered estimate $\hat{r}[n]$ 450 of the unknown signal r[n], as illustrated by Equation 2.

Finally, in one embodiment, a channel model adaptation module 455 acts to update the channel model $\tilde{H}$ at a time when the second input signal r[n] is null. This retraining of $\tilde{H}$ can be performed at any time, but will provide better results if it performed at a time no "double-talk" is occurring, i.e., when there is no contribution to the output signal y[n] from the second input signal r[n]. Note that the channel model adaptation module 455 operates in the same manner as the training module 420 to determine the new coefficients of $\tilde{H}$.

3.0 Operation Overview:

The above-described program modules are employed for implementing the DEC. As summarized above, the DEC provides echo cancellation where only access to an input signal and a composite output signal are available, and the input signal has been subjected to an unknown variable gain function. The following sections provide a detailed discussion of the operation of the DEC, and of exemplary methods for implementing the program modules described in Section 2 with respect to FIG. 4.

3.1 Operational Details of the Dynamic Echo Canceller:

The following paragraphs detail specific operational and alternate embodiments of the DEC described herein. In particular, the following paragraphs describe details of channel modeling for initial training of the DEC; windowed projection-based application of the channel model to live signals; and window size considerations. Following the detailed description of the aforementioned features of the DEC, an operational flow diagram is described in Section 4, with respect to FIG. 5, which summarizes the overall operation of various generic embodiments of the DEC in view of the following detailed description.

3.2 Channel Modeling And Initial Training:

As noted above, the DEC performs the initial channel modeling for determining the coefficients of $\tilde{H}$ at a time when the only input to y[n] is a scaled version of x[n], where the channel H (corresponding to the "black box" or unknown gain described above) is modeled as the product of a slowly-varying characteristic $\tilde{H}$ (i.e., the "scale-free channel model") and a continuous scaling s[n] which varies much faster than $\tilde{H}$. In the time domain, this means:

$$y[n]=s[n](\tilde{h}[n]*x[n]) \qquad \text{Equation 3}$$

where $\tilde{H}$ is modeled as an all-zero filter having $N_b+1$ coefficients as illustrated by Equation 4:

$$\tilde{H}(z)=b_0+b_1z^{-1}+b_2z^{-2}+\ldots+b_{N_b}z^{-N_b} \qquad \text{Equation 4}$$

Further, It should be noted that the order of the gain stage and the channel have been reversed as a tractable approximation of the real model.

3.2.1 Finding the Scale-Free Channel Model

As noted above, the DEC first obtains a pair of training signals x[n] and y[n] in the absence of any remote signal, in order to characterize the transfer function $\tilde{H}$. Each sample y[n] is then normalized by the norm of the relevant region of samples from x[n] that will be used to predict that sample given our transfer function to generate $\tilde{y}[n]$. In general, the relevant region of samples from x[n] for each sample of y[n] includes those samples from x[n] that will be used to predict each corresponding sample of y[n]. As illustrated by Equation 6, the relevant region of samples from x for each value of $\tilde{y}$ is the row of the matrix X used in computing the corresponding value of $\tilde{y}$. Thus, in view of the channel model $\tilde{H}$ illustrated in Equation 4, $\tilde{y}[n]$ is then determined as illustrated by Equation 5:

$$\tilde{y}[n] = \frac{\|y[n-N_b:n]\|}{\|x[n-N_b:n]\|}y[n] \qquad \text{Equation 5}$$

Given this normalized signal $\tilde{y}[n]$, the filter coefficients b of $\tilde{H}$ are then determined by finding those coefficients that provide a best fit of x[n] to $\tilde{y}[n]$. In one embodiment, this best fit is determined using a least squares approach as illustrated below in Equation 6. However, it should be appreciated that in alternate embodiments, other data fitting techniques, including for example, techniques such as least mean squares (LMS), normalized least mean squares (NLMS), etc., may also be used if desired. In particular, the general idea to find the coefficients b of $\tilde{H}$ that provide the best data fit, and as such, any desired data fitting technique can be used. Assuming a least squares approach, Equation 6 illustrates the method for determining the coefficients b of $\tilde{H}$ given x[n] to $\tilde{y}[n]$:

$$\begin{bmatrix} x[0] & \cdots & x[N_b-1] \\ x[1] & \cdots & x[N_b] \\ \vdots & \vdots & \vdots \end{bmatrix} \begin{bmatrix} b_{N_b} \\ \vdots \\ b_0 \end{bmatrix} = \begin{bmatrix} \tilde{y}[N_b-1] \\ \tilde{y}[N_b] \\ \vdots \end{bmatrix} \quad \text{Equation 6}$$

which can be expressed as $Xb=\tilde{y}$ to simplify the notation. Given this problem setup, it is necessary to solve for b, where:

$$b = (X^T X)^{-1} \tilde{y} \quad \text{Equation 7}$$

Note that the length of the training signal pair x[n] and y[n] can be any desired length. However, it has been observed that better training results were obtained when the sample length of the training signal pair x[n] and y[n] was at least an order of magnitude longer than the number of filter taps of $\tilde{H}$. For example, in a tested embodiment, a filter $\tilde{H}$ having 201 taps (100 causal and 100 anticausal) was trained once on a speech signal (original (x[n]), and subjected to an unknown gain function (y[n])) that was 64,000 samples in length.

3.3 Applying the Channel Model To Real Signals:

Once $\tilde{H}$ has been determined, as described above, the DEC can then be used to predict the contribution of x[n] to y[n] in a scale-free sense for live signals wherein the unknown signal r[n] is also making a contribution to y[n], as illustrated by Equation 8:

$$y[n]=s[n](x[n]*\tilde{h}[n])+r[n] \quad \text{Equation 8}$$

where r[n] is the remote or unknown signal. However, it should be clear that s[n] is still needed in order to evaluate equation 8.

In order to find a non-trivial s[n] it is assumed that s[n] has some unknown parametric form that varies more slowly than y[n] itself, but that s[n] varies much faster than $\tilde{H}$. Without this assumption, a trivial s[n] could easily be identified that would completely eliminate y[n] (where $s[n]=y[n]/(x[n]*\tilde{h}[n])$), but would unfortunately also eliminate r[n].

However, as described in further detail below, a non-trivial s[n] is determined via a window-based projection of $\tilde{h}[n]*x[n]$ onto y[n]. In general, this projection-based technique operates by breaking both x[n] and y[n] into windows, then removing the projected "best fit" of $\tilde{h}[n]*x[n]$ from y[n] to recover the estimate of r[n].

In one embodiment, as described in Section 3.3.1, vector projection is used to model s[n] as being piecewise constant over the windows. In a related embodiment, as described in Section 3.3.2, a "ramp projection" is used to model s[n] over the windows. Unlike the vector projection of the first embodiment, this "ramp projection" is not piecewise constant over the windows. In fact, this ramp projection allows for a piecewise linear (or non-linear) variation in gain within each window, depending upon the degree of polynomial used to model the variation in gain. However, for purposes of explanation, Section 3.3.2 describes the implementation of a linear ramp. Those skilled in the art will understand the extension of that discussion to higher order (and thus non-linear) piecewise projections for each window.

3.3.1 Vector Projection For Piecewise Constant Gain:

As noted above, in one embodiment s[n] is modeled as a piecewise constant gain over each window having a length of W samples. In particular, given a window size of W samples from $\tilde{h}[n]*x[n]$, which will be referred to here as $\tilde{y}[n]$, and the corresponding W samples of y[n], s[n] is modeled as being constant over the window. Therefore, in identifying s[n], the scale factor $\alpha$ (representing s[n]) is determined such that $\alpha\tilde{y}[n]$ is as close to y[n] as possible. In other words, the scale factor $\alpha$ is identified for each window that provides the best fit of $\tilde{h}[n]*x[n]$ onto y[n].

In one embodiment, this best fit is determined using a least squares approach as illustrated below in Equation 9. However, it should be appreciated that in alternate embodiments, other data fitting techniques, including for example, techniques such as least mean squares (LMS), normalized least mean squares (NLMS), etc., may also be used if desired. For example, with respect to a least squares based best fit, the scale factor $\alpha$ is determined for each window by finding the $\alpha$ that minimizes the following equation for a window having length W:

$$\min_\alpha \sum_{n=0}^{W-1} (y[n] - \alpha\tilde{y}[n])^2 \quad \text{Equation 9}$$

Expanding Equation 9 and taking the derivative with respect to $\alpha$, a single minimum (best fit $\alpha$ value) can be easily identified as illustrated by Equation 10, where:

$$\alpha = \frac{\sum y[n]\tilde{y}[n]}{\sum \tilde{y}^2[n]} = \frac{\langle y, \tilde{y} \rangle}{\langle y, y \rangle} \quad \text{Equation 10}$$

As should be appreciated by those skilled in the art, the formulation of Equation 10 represents a simple vector projection of y[n] onto $\tilde{y}[n]$.

3.3.2 Projection For Piecewise Non-Constant Gain:

As noted above, in one embodiment s[n] is modeled as a piecewise constant gain over each window having a length of W samples. However, one potential problem with modeling s[n] as a piecewise constant gain is that s[n] may actually be changing over the course of the window. Consequently, in another embodiment, described below, higher order modeling of s[n] is performed to allow for more exact modeling of the actual gain characteristics of s[n]. This higher order modeling is termed "ramp projection." As noted above, this ramp projection allows the gain to vary within each window (either linearly or non-linearly, depending upon the degree of modeling used).

For example in the case of a linear modeling (first order polynomial), s[n] is assumed to be piecewise linear within each window, starting at some unknown offset $\alpha$ and having some unknown slope $\beta$. As with the piecewise constant assumption described in Section 3.3.1, the variables $\alpha$ and $\beta$ are determined such that $(\alpha+\beta n)\tilde{y}[n]$ is as close to y[n] as possible. In other words, variables $\alpha$ and $\beta$ are identified for each window that provides the best fit of $\tilde{h}[n]*x[n]$ onto y[n]. Again, as with Equation 9, Equation 11 assumes a least squares fit, however, other data fitting techniques may also be used. Thus, assuming a least squares fit, this leads to the minimization problem illustrated by Equation 11, where:

$$\min_{\alpha,\beta} \sum_{n=0}^{W-1} (y[n] - (\alpha + \beta n)\tilde{y}[n])^2 \quad \text{Equation 11}$$

Expanding Equation 11 and taking derivatives, a global minimum can then be identified by solving the following system of equations:

$$\begin{bmatrix} \sum \tilde{y}^2[n] & \sum n\tilde{y}^2[n] \\ \sum n\tilde{y}^2[n] & \sum n^2\tilde{y}^2[n] \end{bmatrix} \begin{bmatrix} \alpha \\ \beta \end{bmatrix} = \begin{bmatrix} \sum \tilde{y}[n]y[n] \\ \sum n\tilde{y}[n]y[n] \end{bmatrix} \quad \text{Equation 12}$$

3.3.3 Window Length Considerations:

As described above, s[n] is determined across each window of size W. Therefore, it should be intuitive that the shorter the window length, the better the fit of ỹ[n] to y[n] will be. However, shortening the window size too much comes at a price. In particular, shorter windows will result in more abrupt changes in the fit signal s[n]ỹ[n]. This is a subtle issue, since in the absence of a remote signal r[n], this will often result in further reducing the power of the residual, which is the desired effect. However, when r[n] is present, the use of shorter windows can cause an increase in distortion in the recovered version r̂[n] of the remote signal r[n].

The reason for the increase in distortion is that shorter windows lead to a greater number of degrees of freedom in s[n], i.e., the size of the pieces of the piecewise constant or piecewise linear (or non-linear) estimates. Since the minimization for solving for s[n] is trying to cancel y[n], the use of shorter windows will therefore act to partially cancel r[n] along with the transformed version of x[n]. Consequently, window sizes should not be made so short as to cause undue distortion in the recovered signal r̂[n].

Figure 5:
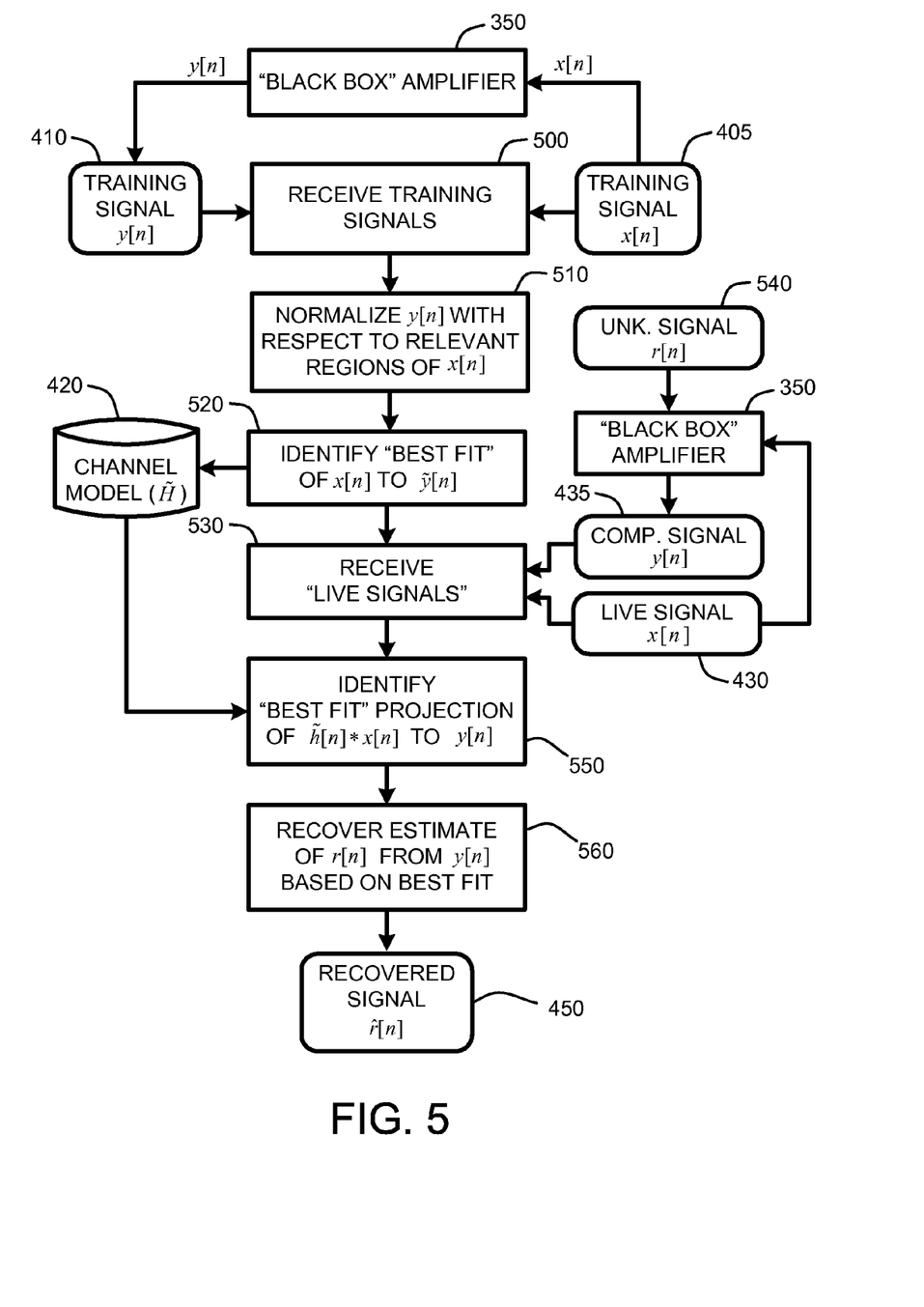
FIG. 5 provides an exemplary operational flow diagram illustrating general operation of one embodiment of the DEC, as described herein.

4.0 Dynamic Echo Canceller Operational Embodiments:

The processes described above with respect to FIG. 1 through FIG. 4 are illustrated by the general operational flow diagram of FIG. 5. In general, FIG. 5 illustrates an exemplary operational flow diagram showing generic operational embodiments of the DEC. It should be noted that any boxes and interconnections between boxes that are represented by broken or dashed lines in FIG. 5 represent alternate embodiments of the DEC described herein, and that any or all of these alternate embodiments, as described below, may be used in combination with other alternate embodiments that are described throughout this document.

Further, before describing the operational flow diagram of FIG. 5, it should also be noted that as with several of the preceding examples presented herein, FIG. 5 generally illustrates the use of the DEC in the role of an acoustic echo cancellation (AEC) system. However, as noted above, the DEC is not intended to be limited to use as an AEC system or to processing audio signals, and the arrangement as illustrated in FIG. 5 is provided only for purposes of explanation.

In particular, as illustrated by FIG. 5, the DEC begins operation by receiving 500 a pair of training signals x[n] 405 and y[n] 410 for a channel H. As described above, in the context of an audio signal, the training signal y[n] 410 is produced by subjecting the training signal x[n] 405 to an unknown gain function (across the channel H). A simple example of this concept is the gain applied to x[n] across the "black box" amplifier 350 (see discussion of FIG. 3 in Section 2.0).

The DEC then normalizes 510 each sample of y[n] 410 with respect to the "relevant region" of samples from x[n] 405 to generate a normalized signal ỹ[n]. A windowed "best fit" of the training signal x[n] 405 is then fit to the normalized signal ỹ[n] to learn the coefficients for the scale free channel model H̃ 420.

After the DEC has learned the channel model H̃ 420, the DEC has been "trained," and is ready to receive 530 "live" signals x[n] 430 and y[n] 435, wherein y[n] is a combination of an unknown signal r[n] 540 and the known signal x[n] 430 that has been scaled by the unknown gain function of the "black box" amplifier 350. Once the DEC receives both signals, x[n] 430 and y[n] 435 and the channel model H̃ 420, a windowed best fit projection 550 (as described in Section 3.3) of h̃[n]*x[n] 430 onto y[n] 435 is performed to determine the unknown continuous scaling s[n] being applied to x[n] in combination with the variable gain function H̃. Finally, given this best fit 550 of h̃[n]*x[n] onto y[n], it is simple to recover r̂[n] 560, the estimate of r[n] 540, as illustrated by Equation 2, where r̂[n]=y[n]−s[n](h̃[n]*x[n]).

This recovered signal r̂[n] 450 can then be used for any desired function, such as, for example, real-time cancellation of the input signal x[n] 430 from the composite signal y[n] 435.

The foregoing description of the Dynamic Echo Canceller has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the Dynamic Echo Canceller. It is intended that the scope of the invention be limited not by this detailed description, but rather by the claims appended hereto.

What is claimed is:

1. A process for training a signal extractor for extracting an unknown signal from a combination signal, comprising process actions for:
   receiving a first training signal;
   receiving a second training signal, wherein the second training signal represents a version of the first training signal that has been subjected to an unknown time-varying gain function across a signal channel, and wherein the unknown time-varying gain function is not determined based on any other signal;
   identifying coefficients of a scale-free channel model by performing a best fit of the first training signal to a normalized version of the second training signal; and
   using the coefficients of the scale-free channel model in a signal extractor for extracting an unknown signal from a combination signal and a known signal, wherein the combination signal represents a combination of the unknown signal and a version of the known signal that has been subjected to the unknown time-varying gain function across the signal channel.

2. The process of claim 1 wherein each sample of the normalized version of the second training signal is separately produced by normalizing each sample of the second training signal based on a norm computed from corresponding relevant samples of the first training signal.

3. The process of claim 1 wherein the best fit of the first training signal to the normalized version of the second training signal for identifying the coefficients of the scale-free channel model comprises identifying the coefficients that minimize an error of a least squares fit of the first training signal to the normalized version of the second training signal.

4. The process of claim 1 wherein extracting the unknown signal from the combination signal and the known signal comprises:
   performing a windowed projection of a version of the known signal that has been filtered by the identified coefficients onto the combination signal to identify a best fit of the filtered version of the known signal to the combination signal; and subtracting the identified best fit of the filtered version of the known signal from the combination signal to recover a copy of the unknown signal from the combination signal.

5. The process of claim 4 wherein the windowed projection assumes a gain that is piecewise constant over each window.

6. The process of claim 4 wherein the windowed projection assumes a gain that has a parametric form that is not piecewise constant over each window.

7. A physical computer-readable storage media having computer executable instructions for cancelling a first signal from a combination signal, said computer executable instructions comprising:

receiving a training signal;

identifying filter coefficients corresponding to an unknown channel characteristic being applied to the training signal by performing a windowed best-fit of the training signal to a copy of the training signal that has been normalized following application of the unknown channel characteristic to the copy of the training signal, and wherein the unknown channel characteristic is not determined based on any other signal;

receiving a composite signal comprising a combination of an unknown signal and an input signal that has been that has been modified by the unknown channel characteristic;

performing a windowed projection of a version of the input signal that has been filtered by the identified filter coefficients onto the composite signal to identify a best fit of the filtered version of the input signal to the composite signal; and subtracting the identified best fit of the filtered version of the input signal from the composite signal to cancel the input signal from the composite signal.

8. The physical computer-readable storage media of claim 7 wherein normalizing the copy of the training signal comprises normalizing each sample of the copy of the training signal as a function of a norm computed from corresponding relevant samples of the training signal.

9. The physical computer-readable storage media of claim 7 wherein the windowed best-fit of the training signal to the copy of the training signal comprises identifying the filter coefficients that minimize an error of the fit of the training signal to the copy of the training signal.

10. The physical computer-readable storage media of claim 7 wherein the windowed projection of the filtered version of the input signal onto the composite signal uses a vector projection that assumes a gain that is piecewise constant over each window.

11. The physical computer-readable storage media of claim 7 wherein the windowed projection of the filtered version of the input signal onto the composite signal uses a projection that assumes a gain function that has a parametric form that is not piecewise constant over each window.

12. The physical computer-readable storage media of claim 11 wherein the assumed gain function over each window is linear over time.

13. The physical computer-readable storage media of claim 11 wherein the assumed gain function over each window is nonlinear in time but has a parametric form.

14. The physical computer-readable storage media of claim 7 wherein:

the input signal is received via a microphone and the unknown signal included within the composite signal represents a remote audio signal; and wherein cancellation of the input signal from the composite signal provides acoustic echo cancellation of the input signal from the composite signal.

15. A method for separating an unknown signal from a composite signal, comprising using a computing device to:

receive a direct copy of a training signal (x[n]);

receive a filtered copy (y[n]) of the training signal that has been transformed by an unknown transfer function, and wherein the unknown transfer function is not determined based on any other signal;

identify coefficients for characterizing the unknown transfer function by performing a windowed best fit of x[n] to a normalized version (ŷ[n]) of y[n];

receive an input signal;

receive a composite signal comprising a combination of an unknown signal and a filtered copy of the input signal that has been transformed by the unknown transfer function;

identifying a best fit of a copy of the input signal transformed using the identified coefficients by applying a windowed projection of the transformed copy of the input signal onto the composite signal; and separating the unknown signal from the composite signal by subtracting the best fit copy of the transformed input signal from the composite signal.

16. The method of claim 15 further wherein ŷ[n] is constructed by performing a windowed normalization of y[n] using norms computed from corresponding relevant samples of x[n].

17. The method of claim 15 wherein the best fit of x[n] to ŷ[n] comprises performing a windowed least squares fit of x[n] to ŷ[n] to identify the coefficients that characterize the unknown transfer function.

18. The method of claim 15 wherein the windowed projection of the transformed copy of the input signal onto the composite signal uses a vector projection that assumes a transfer function that is piecewise constant over each window.

19. The method of claim 15 wherein the windowed projection of the transformed copy of the input signal onto the composite signal uses a vector projection that assumes a transfer function that has a parametric form that is not piecewise constant over each window.

20. The method of claim 15 wherein separating the unknown signal from the composite signal by subtracting the best fit copy of the transformed input signal from the composite signal is used to provide acoustic echo cancellation of the input signal from the composite signal.

* * * * *